May 12, 1959  G. R. CURTIS  2,886,678
ELECTRICAL TRANSDUCER
Filed Dec. 20, 1956  7 Sheets-Sheet 1

INVENTOR.
GERALD R. CURTIS
BY
Christie, Parker & Hale
ATTORNEYS

May 12, 1959 — G. R. CURTIS — 2,886,678
ELECTRICAL TRANSDUCER
Filed Dec. 20, 1956 — 7 Sheets-Sheet 2

INVENTOR.
GERALD R. CURTIS
BY
Christie, Parker & Hale
ATTORNEYS

May 12, 1959 G. R. CURTIS 2,886,678
ELECTRICAL TRANSDUCER
Filed Dec. 20, 1956 7 Sheets-Sheet 3

INVENTOR.
GERALD R. CURTIS
BY
Christie, Parker & Hale
ATTORNEYS

May 12, 1959 — G. R. CURTIS — 2,886,678
ELECTRICAL TRANSDUCER
Filed Dec. 20, 1956 — 7 Sheets-Sheet 4

INVENTOR.
GERALD R. CURTIS
BY
Christie, Parker & Hale
ATTORNEYS

May 12, 1959     G. R. CURTIS     2,886,678
ELECTRICAL TRANSDUCER

Filed Dec. 20, 1956     7 Sheets-Sheet 5

INVENTOR.
GERALD R. CURTIS
BY
Christie, Parker & Hale
ATTORNEYS.

INVENTOR.
GERALD R. CURTIS
BY
Christie, Parker & Hale
ATTORNEYS.

May 12, 1959 G. R. CURTIS 2,886,678
ELECTRICAL TRANSDUCER
Filed Dec. 20, 1956 7 Sheets-Sheet 7

INVENTOR.
GERALD R. CURTIS
BY
*Christie, Parker & Hale*
ATTORNEYS

United States Patent Office 2,886,678
Patented May 12, 1959

2,886,678

ELECTRICAL TRANSDUCER

Gerald R. Curtis, Duarte, Calif., assignor to Consolidated Electrodynamics Corporation, Pasadena, Calif., a corporation of California Application December 20, 1956, Serial No. 629,661

10 Claims. (Cl. 201—48)

This invention relates to condition-responsive measurement and particularly to a transducer for electrically measuring physical parameters such as pressure, acceleration and displacement.

Electromechanical transducers, as in the present instance, frequently depend upon a strain sensitive wire incorporated in a bridge circuit and subjected to a variable strain responsive to variation in the parameter to be measured. The wire is arranged on a mechanical system susceptible to minute size variation responsive to variation in the parameter of interest. Accurate measurement of the resistance change in the wire is achieved by incorporating the wire or wires as one or more arms of a conventional bridge.

There are many instances where it is important that such transducers exhibit a substantially linear response throughout the sensitivity range of interest and that they be largely insensitive to forces other than the parameter of interest. These factors are of major significance in transducers intended for measurement of force variations within a small range.

I have now developed a small, lightweight and rugged transducer characterized by a high degree of linearity and a minimum sensitivity to force fields originating from other than the parameter of interest. In its various modifications the transducer is adapted to sense pressure, acceleration, displacement, centrifugal force and, in general, any parameter which can be expressed as a force.

The structure and arrangement of parts of the active elements of the transducer provide an electromechanical transducer of miniature size. The embodiments described herein can fit into a volume less than ¼ inch in axial length by ½ inch in diameter.

The active element of the transducer comprises a housing in which are mounted flexible members. The flexible members are preferably mounted in a crisscross fashion with their extremities held fixed to a support. A force can therefore be applied at the crossing point of the flexible members. This force may be in the form of any measureable parameter. Examples are pressure, acceleration and displacement.

An insulated post is mounted upon the flexible members between the crossing point and each fixed point, thus providing a plurality of insulated posts. Strain sensitive wires are wound upon the posts under tension and connected to provide a plural-armed bridge circuit. The posts mounted on one flexible member extend in a direction opposite to the posts mounted on the other flexible member. Hence, the insulated posts mounted on one flexible member will move outwardly and the insulated posts on the other flexible member will move inwardly with respect to the crossing point of the members when a force is applied at the crossing point. Since the strain wires are mounted and supported by the posts, the movements of the posts in response to applied forces will effect additional tension on some of the arms of the bridge circuit and relaxation of the remaining arms.

The crisscrossed structure, as well as other specific structural features, permit the construction of a miniature sized electromechanical transducer.

The transducer of the invention and its manner of use will be more clearly understood from the following detailed description taken in conjunction with the accompanying drawings, in which.

Figure 1:
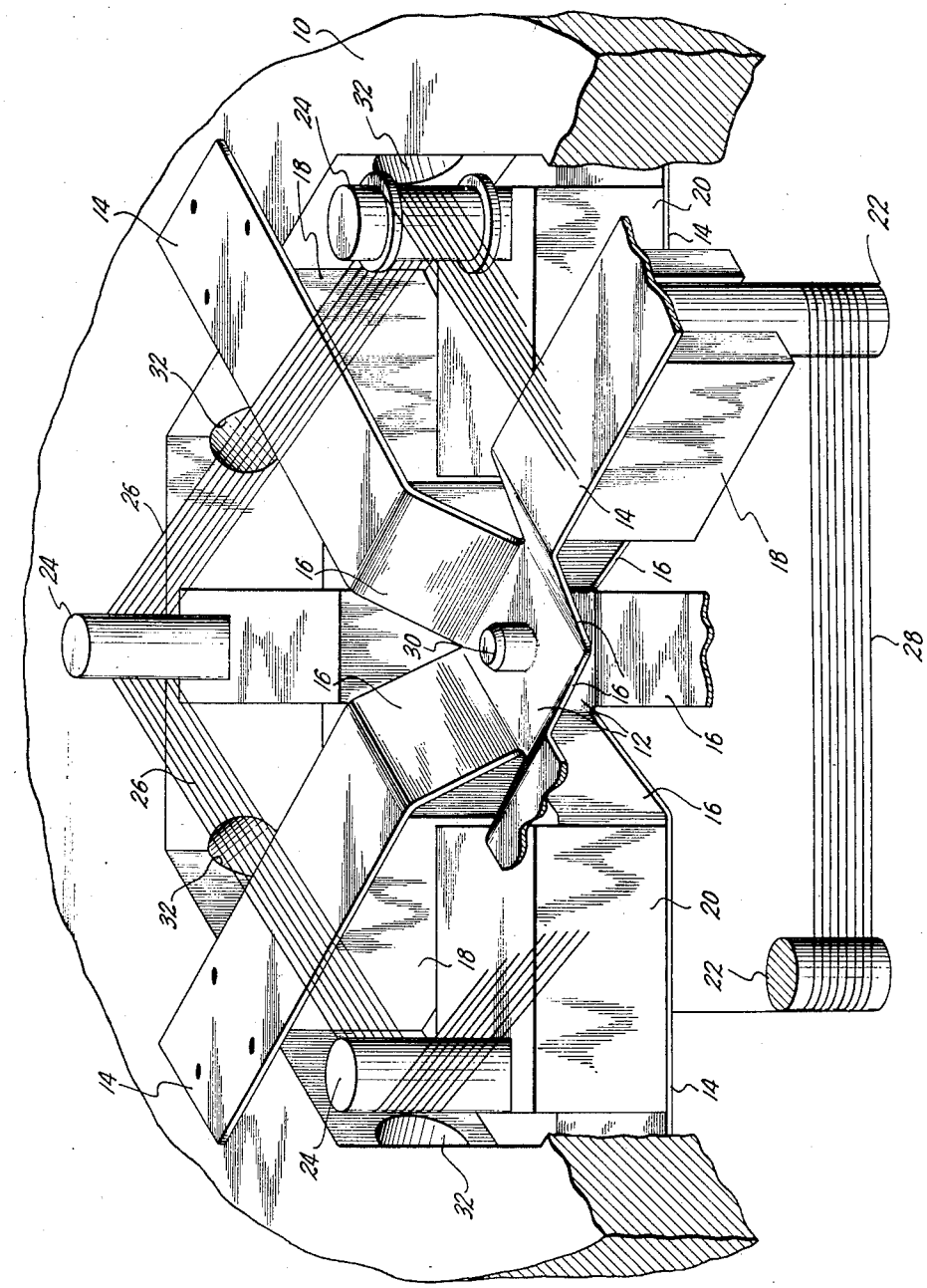
Fig. 1 is a perspective view of the active elements of the transducer of the invention with portions thereof cut away to more clearly show important features.

Referring more specifically to Fig. 1, a case 10 is used to support the active elements. A pair of flexible members are mounted within the case 10 with portions thereof connected, such as by welding or soldering to the case. The flexible members preferably are in the form of flat springs. The flat flexible spring means shown in the embodiment of Fig. 1 each include a flat central portion 12. The flat central portions 12 are preferably located centrally within the case 10 and each extend along a substantially common transverse plane. The corners of each central portion may coincide with the mid-point of an edge of the other flat central portion, as illustrated.

A plurality of arms 14 extend radially from the central portions 12. Each arm extends from a side edge of a flat central portion 12, with each arm being in alignment with an oppositely extending arm.

A portion 16 of the arms 14 extends outwardly from the central portions 12 at an angle with respect to the common transverse plane. The angle formed by portion 16 is an acute angle, preferably of about 45°. Portions 16 all form the same angle with respect to the common transverse plane and are of the same dimensions.

An important feature of my new electromechanical transducer is that all the angled portions of one flexible member extend upwardly from the common transverse plane while the angled portions of the other flexible member extend downwardly from the common transverse plane. The importance of this feature will become more apparent as the description proceeds.

Connected to each arm 14 of both flexible members are mounting means 18 and 20. Mounting means 18 are connected to the arms of the upper flexible flat spring means while mounting means 20 are connected to the arms of the lower flexible flat spring means. Mounting means 18 extend downwardly and mounting means 20 extend upwardly.

An insulated post 22 is mounted in each of the mounting means 18 and an insulated post 24 is mounted in each of the mounting means 20. The posts may be cemented to the mounting means within notches formed in the mounting means.

Strain sensitive wires 26 are mounted and supported by the posts 24. A second series of strain sensitive wires 28 are mounted and supported by the insulated posts 22. Wires 26 and 28 may be bifilar. The bifilar wires 26 and 28 each form two arms of a four-arm bridge circuit.

The crisscross arrangement of the arms 14 permits the arms of one flexible flat spring to be interleaved with respect to the arms of the other flexible flat spring. The provision of the angled portions 16 extending in opposite directions permits the mounting posts to extend in opposite directions. Hence, it can be seen that the structure is such that the active elements of my new transducer are located within the least space possible.

The arms 14 of the flexible flat spring means are rigid against any forces other than those applied axially of the casing 10. Hence, extraneous, undesired forces will not affect the active element, and spurious signals will not arise in the bridge circuit.

The force parameter to be measured is transmitted to the flexible members by means of a force rod connected centrally through the central portions 12. The reduced diameter portion 30 of the force rod is shown in Fig. 1.

It can be seen that any forces applied to the force rod will flex the arms of the flat flexible spring members. Since the ends of the arms 14 are fixedly connected to the case 10, the arms will pivot about the fixed connection. The pivotal action of the arms 14 causes a pivotal motion of the posts 22 and 24. However, since the posts 22 and 24 extend in opposite directions, one set of posts will move outwardly from the axis of casing 10 and the other set will move inwardly. Hence, one of the bifilar strain wires 26 and 28 will have additional tension placed thereon and the other will have less tension placed thereon. This change in tension will change the resistance of the wires. The change in resistance can be measured electrically and the measurements serve to ascertain the value of the force applied to the force rod.

The provision of four active arms in a bridge circuit provides greater sensitivity in the force range desired than is obtainable from bridge circuits having less than four active arms. The holes 32 formed in the casing 10 are for the insertion of electrical conductors for applying voltage across the bridge and for obtaining electrical measurements.

Another important feature of my new transducer is that since the wires are all equally spaced from metal surfaces, the transfer of heat from the wires is the same. Providing for equal transfer of heat reduces the tendency of spurious signals inherent in unequal heat transfer.

Figure 2:
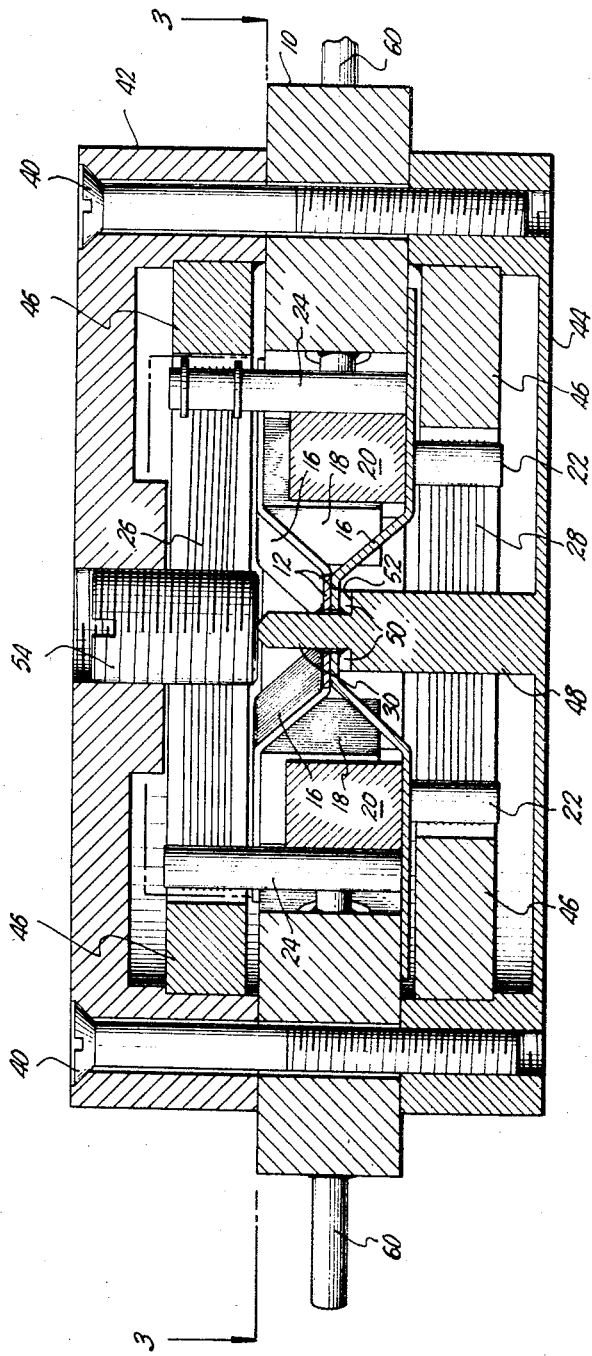
Fig. 2 is a sectional elevational view showing the active element of Fig. 1 used in a pressure transducer, taken along lines 2—2 of Fig. 3.

Fig. 2 is a sectional view showing the transducer used as a pressure measuring means. Connected to the case 10 by means of screws 40 are a cover 42 and a flexible diaphragm 44. Heat dissipating elements 46 may also be provided adjacent each of the wires 26 and 28. Heat dissipaters 46 assure the equal dissipation of heat from the wires 26 and 28, preventing spurious signals resulting from unequal heat dissipation.

The force rod 48 is attached to the diaphragm 44. The reduced diameter portion 30 of force rod 48 protrudes through holes formed within the flat central portions 12 of the flexible members.

The active elements of the transducer are formed by mounting the flexible members within the casing 10 and winding wires 26 and 28 about the posts at the same time and under equal tension. The diaphragm 44 is a separate component which is connected to the casing 10. The force rod 48 may be cemented to the flexible members at the central portion 12. The cement is placed within a space 50 provided between the central portion 12 and shoulder 52 of the force rod.

By reason of the instrument design both the sensing elements and the diaphragm are allowed to first independently achieve mechanical equilibrium and are then connected together in this equilibrium condition. The resulting assembly is therefore substantially stress free which is an important advantage in a sensitive device of this character.

To prevent excessive movement of the force rod 48, an overtravel stop 54 may be adjustably screwed into the cover member 42.

Figure 3:
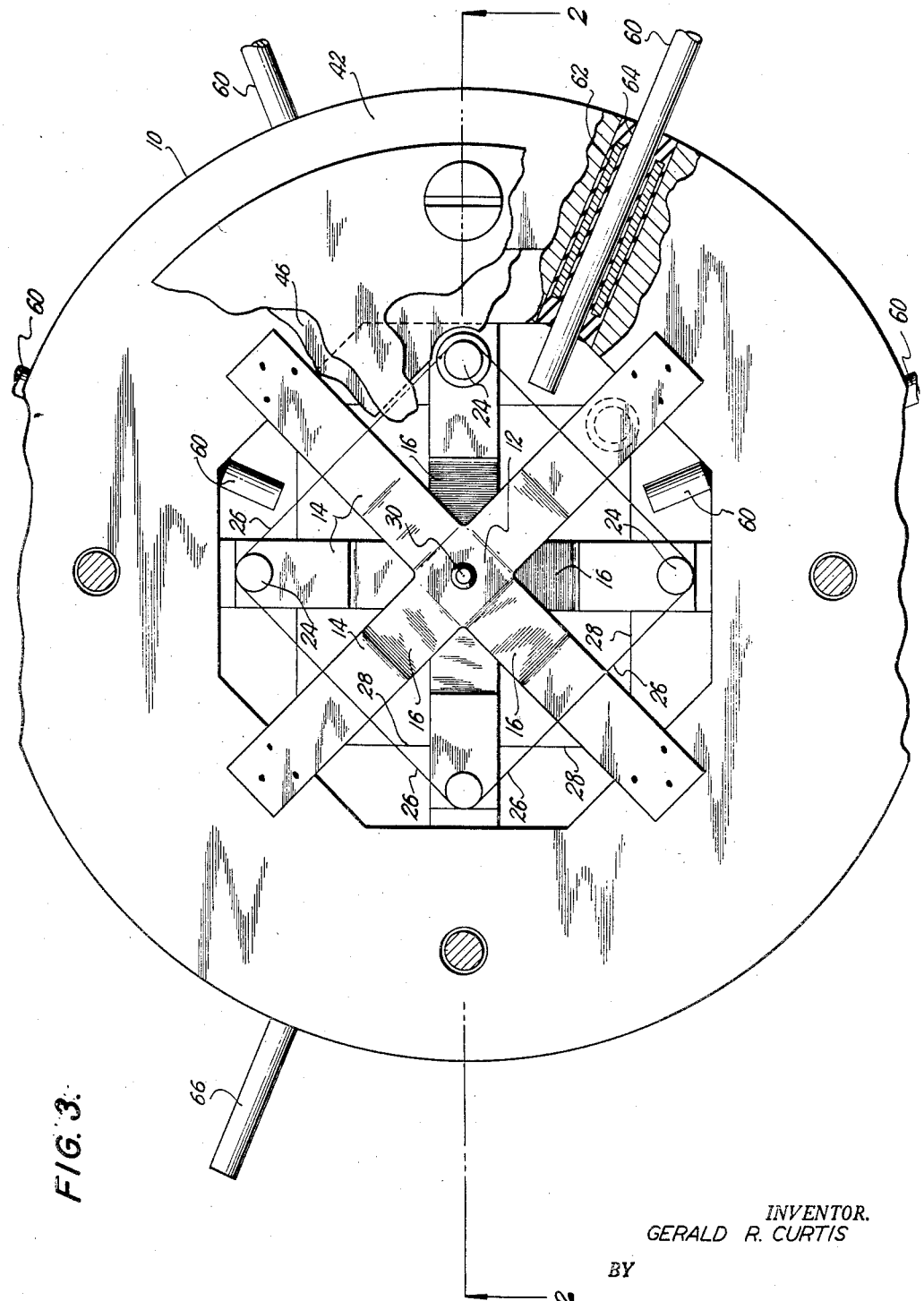
Fig. 3 is a view taken along lines 3—3 of Fig. 2 with portions cut away to show certain features.

A plurality of electrical conducting wires 60 are placed within the holes formed in the casing 10 and electrically connected to the appropriate wires 26 and 28 to form lead-in and lead-out wires for the bridge circuit. An examination of Fig. 3 shows clearly that four conducting wires 60 are utilized with the four-armed bridge circuit. The wires 60 are firmly attached within a casing 10 by means of a ceramic tube insulator 62 which is hermetically sealed with cement 64.

A reference pressure inlet 66 is also provided to establish a reference pressure on the inside of the diaphragm.

Figure 4:
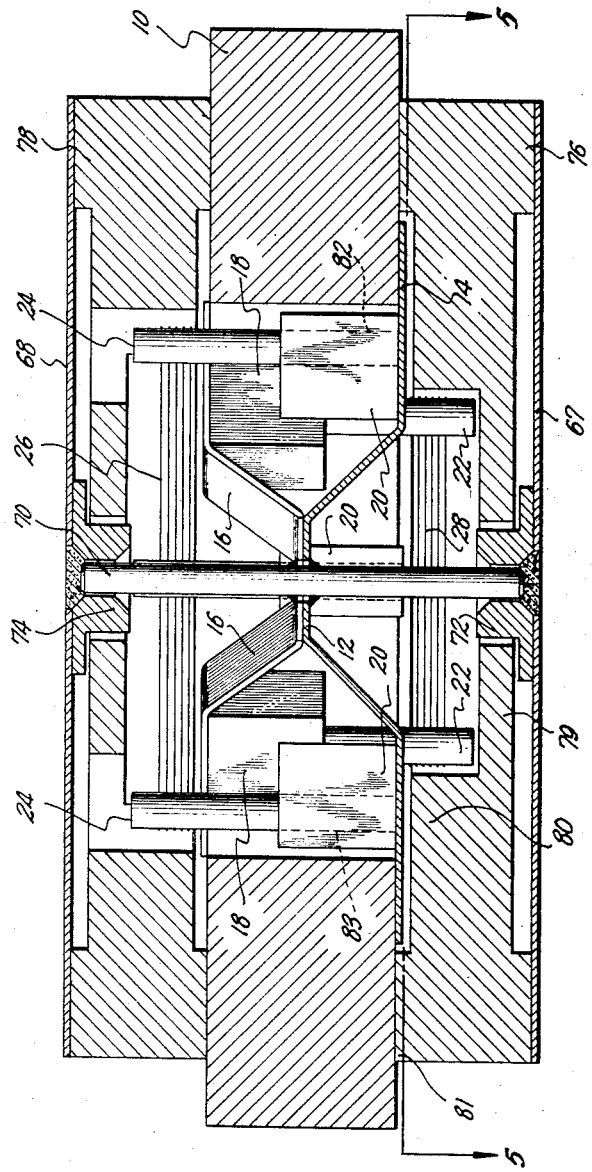
Fig. 4 is a sectional elevational view showing the use of the active element as a differential pressure transducer.
Figure 5:
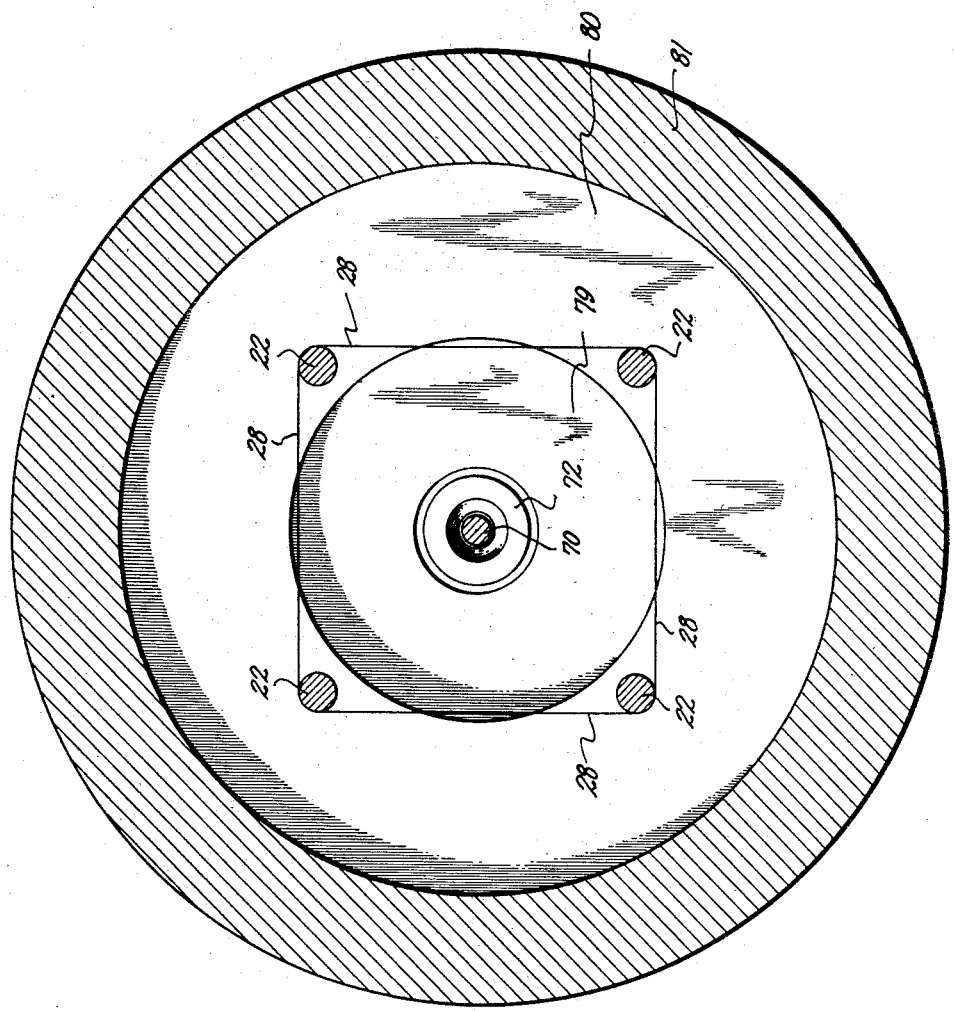
Fig. 5 is a view taken along lines 5—5 of Fig. 4.

Figs. 4 and 5 are a sectional view and a view taken along lines 5—5 of Fig. 4, respectively, showing my new invention used as a differential pressure transducer. Instead of a force rod being utilized which terminates slightly above the central portion of the flexible members, a force rod is used which extends from a first diaphragm 67 through the central portions 12 of the flexible members and to a second diaphragm 68. The force rod 70 is cemented to the central portions 12 and also cemented at its longitudinal extremities to hub portions 72 and 74 of diaphragms 67 and 68, respectively. The diaphragms 67 and 68 are connected to heat dissipaters 76 and 78, respectively. The heat dissipaters are in the shape of stair stepping concentric circles, the stepping circles being shown clearly in Fig. 5 at 79, 80 and 81.

An examination of Fig. 4 shows that if forces such as pressure are applied against the diaphragms 67 and 68, the pressure differential will effect a movement of force rod 70 and the flexible members connected to the force rod in a manner to increase the tension on one bifilar winding and relax the tension on the other bifilar winding. The operation of the flexible spring system is similar to that described in conjunction with Figs. 1, 2 and 3.

If desired, the mounting means 18 and 20 may have a cylindrical hole formed therein rather than a notch formed on an edge thereof, such as shown in Fig. 1. The cylindrical holes are identified by dotted lines 82 and 83 in Fig. 4.

The arrangement and configuration of the spring means makes possible the construction of a double diaphragm transducer which in turn makes the differential pressure measurement of liquids and gases possible. The double diaphragm construction also provides a symmetrical system exhibiting matched frequency response not achievable with a conventional single diaphragm construction.

Figure 6:
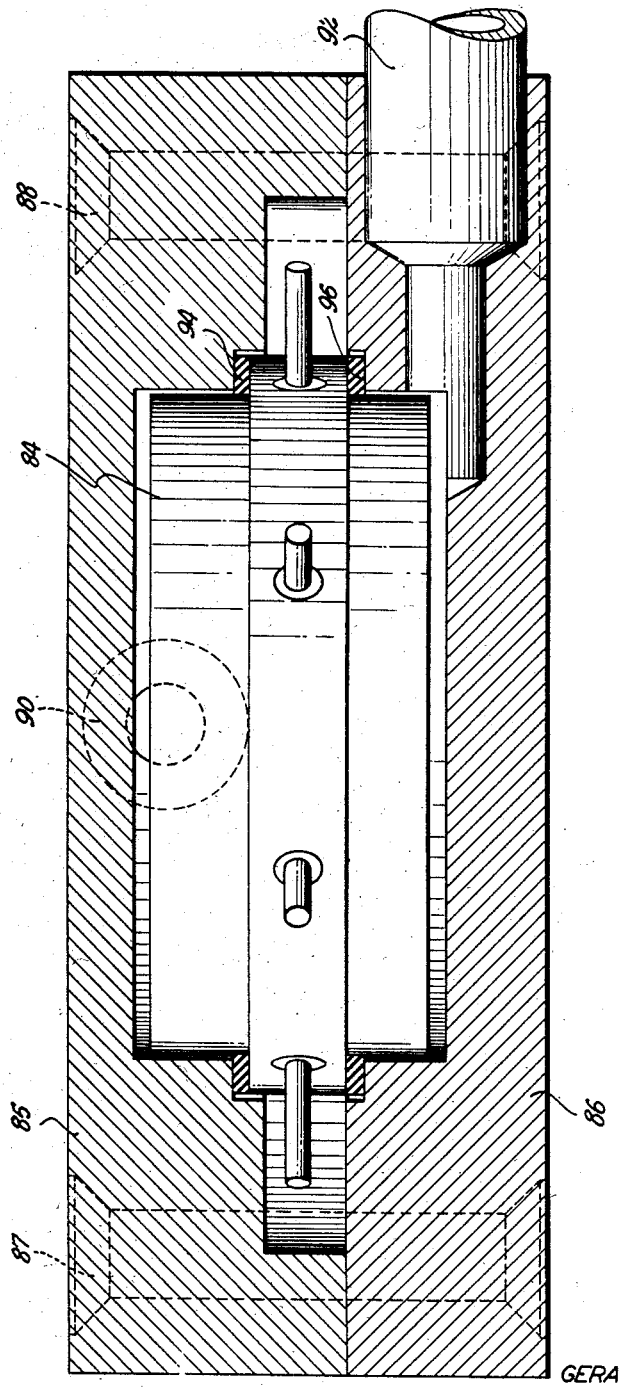
Fig. 6 shows a sectional view of an adapter utilized to house an electromechanical transducer constructed in accordance with the invention.

Fig. 6 shows one manner in which the differential pressure transducer shown in Figs. 4 and 5 may be mounted in an adapter. The differential pressure transducer 84 is shown mounted in a space substantially defined by an upper adapter member 85 and a lower adapter member 86 riveted together by rivets 87 and 88. Pressure is admitted against one diaphragm by means of the pressure inlet 90 (shown in dotted lines). Pressure is admitted against the other diaphragm through a pressure conduit 92. The resistance of the bifilar windings located in differential pressure transducer 84 and the resulting electrical current is a function of the difference in pressure against the diaphragms of the pressure transducer.

Rubber seals 94 and 96 are positioned against shoulders of the transducer 84 as pressure seals and shock absorbers.

Figure 7:
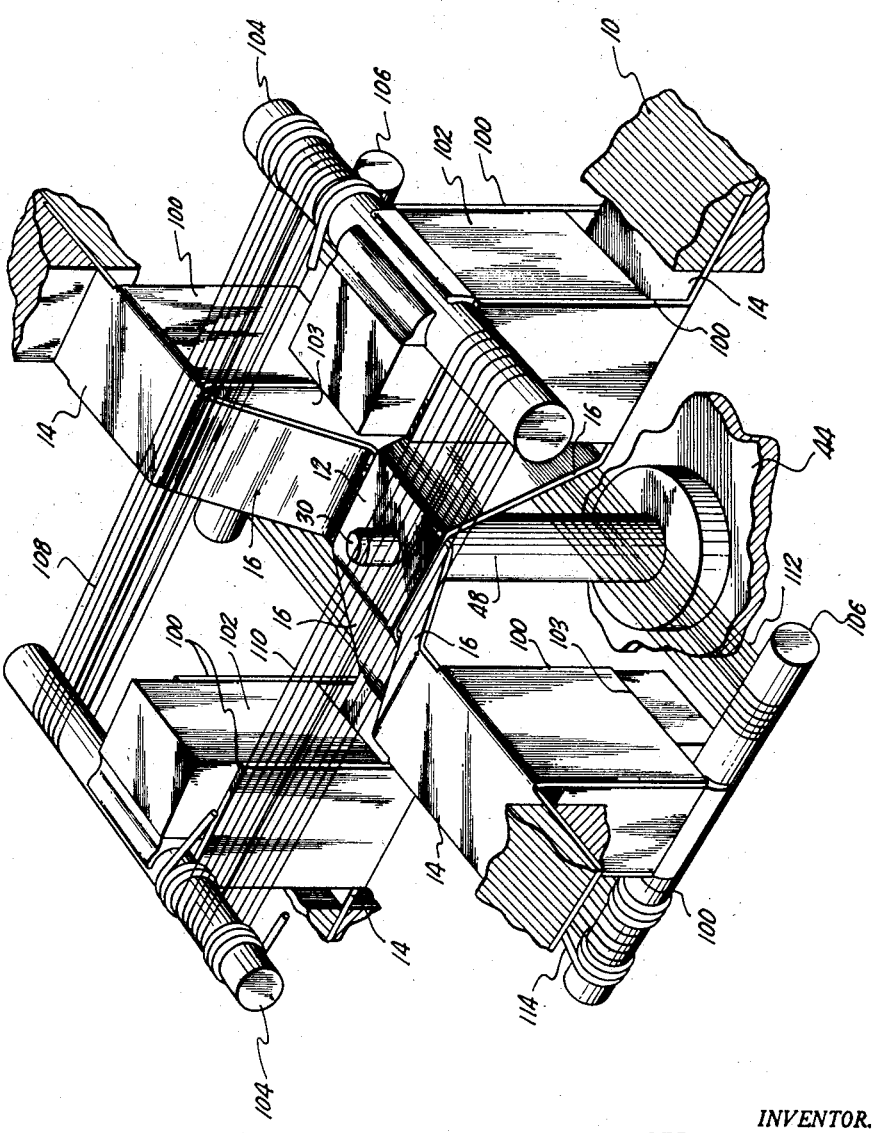
Fig. 7 is a perspective view showing a second preferred modification of the active transducer element.

Fig. 7 shows a second preferred modification of my new electromechanical transducer. The embodiment shown in Fig. 7 may also be used to measure any measureable force parameter such as pressure, displacement, and acceleration.

The central portions 12 of Fig. 7 are rectangular in form with their edges being coincident. Instead of having four arms upon each flexible member, there are two arms. As in the embodiment shown in Figs. 1, 2 and 3, the angled portions 16 of the flexible members extend in opposite directions from a common transverse plane. Portions 16 of each arm are equal angled.

Each arm 14 may have a pair of vertical guide members 100 integral therewith, in which are mounted, as by welding, the post mountings 102 and 103.

Posts 104 and posts 106 are cemented in a notch formed in an upper corner of post mountings 102 and 103. The axis of each post 104 and 106 are in planes transverse to the longitudinal axis of the arms to which they are attached.

Instead of bifilar windings, a single-threaded wire is supported between each end of a post and a corresponding end of the post mounted in the aligned arm. Hence, single-threaded wires 108 and 110 form two arms of the bridge circuit and single-threaded wires 112 and 114 form the other two arms of the circuit.

In operation, any force applied against the diaphragm 44 effects a movement of force rod 48 which flexes the pair of flexible members. The flexible members pivot about the portion of the flexible members connected rigidly to casing 10. This pivotal motion causes an outward movement of two of the posts and an inward movement of the other two posts. Hence, a tensioning of two of the wires, and a relaxtion of the other two wires, is effected.

I claim:

1. An electrical mechanical transducer comprising a housing, a pair of flexible flat spring means mounted in the housing, each including a flat central portion with both central portions being substantially along a common transverse plane and each having a plurality of arms with each arm being in the same vertical plane as another arm extending from the central portion and each arm having a portion thereof extending outwardly from its central portion at an angle with respect to the common transverse plane and the remaining portion extending along a second transverse plane, the extension angles and lengths being equal for all the arms, but with the extension angles of one spring means being in the opposite direction to the extension angles of the other spring means and all of the arms of both spring means being along different vertical planes, a post mounting connected to each arm providing a plurality of post mountings, the post mountings on each flexible spring means extending in a direction opposite to the post mountings of the other flexible spring means, a post in each of the mounting means, and strain sensitive wires supported under tension by the posts, so that movement of the flexible flat spring means in response to forces applied at their central portions causes increased tension on some wires and decreased tension on the remaining wires.

2. An electrical mechanical transducer in accordance with claim 1 wherein each of the flexible flat spring means has two flexible arms and wherein the posts are mounted so that their axes are in planes transverse to the longitudinal axes of the arms with both ends of each post extending from its respective mounting means and a strain sensitive wire is supported between each end and a corresponding end of the post mounted in the aligned arm.

3. A transducer in accordance with claim 1 wherein each of the flexible flat spring means has four arms and wherein the posts are mounted with their axes perpendicular to the broad sides of the arms with one end of each post extending from its respective mounting means and a bifilar strain sensitive wire is supported on each group of posts extending in the same direction.

4. In a transducer, a frame, a force sensitive system comprising a pair of crisscrossing flexible members mounted within the frame and means for suspending strain sensitive wires under tension between the opposite ends of each flexible member, the force sensing system being in mechanical equilibrium, at least one diaphragm in a state of mechanical equilibrium, and means for assembling the force sensing system and the diaphragm providing a substantially stress free transducer.

5. An electrical mechanical transducer comprising a housing, flexible flat spring means including a plurality of flexible arms radially extending from a central point and mounted in the housing with their extremities fixed to the housing; a post mounted on each arm to provide a plurality of posts, the posts being axially parallel with the direction of a force applied at the central point and on alternate arms extending from the arms in a direction opposite to the post on the intermediate arm; strain sensitive wires supported under tension on each group of posts extending in the same direction; and means for applying a force at the central point to produce radial flexing of the arms, thereby causing additional tension on the wires suspended on one group of posts and relaxation of the wires suspended on the other group of posts.

6. Apparatus in accordance with claim 5 wherein the flexible flat spring means comprises a pair of flexible flat springs arranged adjacent each other in a crisscross manner whereby each arm of one flexible flat spring is between the arms of the other in projection on a horizontal plane.

7. Apparatus in accordance with claim 6 wherein each of the pair of flexible flat springs has four arms.

8. An electrical mechanical transducer comprising a housing, flexible flat spring means mounted in the housing including a plurality of flexible arms extending from a common plane, a first group of the arms being offset in one direction and a second group of the arms being offset in another direction from the common plane to define a space between the two groups of arms; a post mounted on each arm providing a plurality of posts, the posts on the first group of arms extending from the arms in a direction opposite to the posts on the second group of arms; and strain sensitive wires supported under tension on each group of posts, the wires supported on the posts on the first group of arms being exterior of the space as defined on one side by the second group of arms and the wires supported on the posts on the second group of arms being exterior of the space as defined on one side by the first group of arms.

9. Apparatus in accordance with claim 8 wherein each arm of each group of arms is aligned with another arm of the same group to provide pairs of aligned arms.

10. Apparatus in accordance with claim 8 wherein each group of arms comprises four flexible arms.

References Cited in the file of this patent

UNITED STATES PATENTS 2,636,964     Lancor et al.     Apr. 28, 1953
2,721,919     Li et al.     Oct. 25, 1955